(12) United States Patent
Chen et al.

(10) Patent No.: US 11,094,994 B2
(45) Date of Patent: Aug. 17, 2021

(54) BATTERY MODULE AND BATTERY PACK

(71) Applicant: CONTEMPORARY AMPEREX TECHNOLOGY CO., LIMITED, Ningde (CN)

(72) Inventors: Xingdi Chen, Ningde (CN); Kaijie You, Ningde (CN); Yu Tang, Ningde (CN); Ziyuan Li, Ningde (CN); Yuepan Hou, Ningde (CN); Jun Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 210 days.

(21) Appl. No.: 16/394,148

(22) Filed: Apr. 25, 2019

(65) Prior Publication Data
US 2020/0212396 A1 Jul. 2, 2020

(30) Foreign Application Priority Data
Dec. 30, 2018 (CN) .......................... 201822274952.9

(51) Int. Cl.
*H01M 50/24* (2021.01)
*H01M 10/658* (2014.01)
(Continued)

(52) U.S. Cl.
CPC .............. *H01M 50/24* (2021.01); *A62C 3/16* (2013.01); *H01M 10/658* (2015.04);
(Continued)

(58) Field of Classification Search
CPC .. H01M 10/658; H01M 50/24; H01M 50/383; A62C 3/16
(Continued)

(56) References Cited

U.S. PATENT DOCUMENTS

2010/0273034 A1\* 10/2010 Hermann ................. B60K 1/04
429/62
2015/0162578 A1 6/2015 Kim et al.

FOREIGN PATENT DOCUMENTS

CN 106785225 A 5/2017
CN 207409556 U 5/2018
(Continued)

OTHER PUBLICATIONS

Extended European Search Report for European Patent Application No. 19170790.0 dated Jun. 19, 2019.
(Continued)

*Primary Examiner* — James M Erwin
(74) *Attorney, Agent, or Firm* — Heslin Rothenberg Farley & Mesiti P.C.

(57) ABSTRACT

The present disclosure discloses a battery module and a battery pack. The battery module comprises a plurality of battery cells and a fireproof member, wherein each of the plurality of battery cells is provided with a vent, and the vent faces the fireproof member; wherein the fireproof member includes a fireproof member body and a first extension connected to an upper end of the fireproof member; and/or a second extension connected to a lower end of the fireproof member. When thermal runaway occurs to the battery cells, flames and high temperature particles ejected out of the vent are blocked by the fireproof member body and the first extension and/or the second extension, thus preventing the ejected flames and high temperature particles from burning neighboring battery cells, and preventing the battery cells that has undergone thermal runaway from inducing thermal runaway of the neighboring battery cells opposite to the vents.

8 Claims, 7 Drawing Sheets

(51) Int. Cl.
    *A62C 3/16*       (2006.01)
    *H01M 50/256*    (2021.01)
    *H01M 50/383*    (2021.01)
    *H01M 50/30*     (2021.01)

(52) U.S. Cl.
    CPC ....... *H01M 50/256* (2021.01); *H01M 50/383* (2021.01); *H01M 50/394* (2021.01)

(58) Field of Classification Search
    USPC .......................................................... 429/72
    See application file for complete search history.

(56) References Cited

FOREIGN PATENT DOCUMENTS

| | | |
|---|---|---|
| CN | 108615835 A | 10/2018 |
| CN | 209249548 U | 8/2019 |
| CN | 209249549 U | 8/2019 |
| DE | 102012217630 A1 | 3/2014 |

OTHER PUBLICATIONS

International Search Report (and English translation) and Written Opinion of the International Searching Authority for International Application No. PCT/CN2019/120120 dated Feb. 19, 2020.

\* cited by examiner

BATTERY MODULE AND BATTERY PACK

CROSS-REFERENCE TO RELATED APPLICATION

This application claims the priority benefit of Chinese Patent Application Serial No. 201822274952.9 filed on Dec. 30, 2018 and entitled "BATTERY MODULE AND BATTERY PACK", the disclosure of which is incorporated by reference herein in its entirety.

TECHNICAL FIELD

The present disclosure relates to an energy storage component, particularly a battery module and a battery pack.

BACKGROUND

In recent years, with energy density of battery cells becoming higher, it is increasingly urgent for electric vehicles to improve safety of batteries, and thermal runaway is a key issue in safety research on battery cells. As a power source for an electric vehicle, a battery pack is generally disposed in the chassis of an electric vehicle. A battery pack includes a plurality of battery modules that has a plurality of battery cells arranged in a plurality of rows and a plurality of bus bars electrically connected to the plurality of battery cells.

In the existing technologies, battery modules of a battery pack are not provided with a fireproof member. Consequently, when thermal runaway occurs to battery cells, vents of the battery cells ejects flames and high temperature particles which are likely to burn adjacent battery cells, causing chain reactions that drive the entire battery pack to cause even more serious safety accidents.

SUMMARY

In one embodiment of the present disclosure, it is provided a battery module, including:

a plurality of battery cells, wherein each of the plurality of battery cells is provided with vents; and a fireproof member, the vent of each of the plurality of battery cells faces the fireproof member, the fireproof member including a fireproof member body and a first extension connected to one end of the fireproof member, and the first extension extends in a direction towards the battery cells; and/or the fireproof member including a fireproof member body and a second extension connected to the other end of the fireproof member, and the second extension extends in a direction towards the battery cells.

In an embodiment of the present disclosure, the fireproof member comprises the fireproof member body, the first extension and the second extension.

In an embodiment of the present disclosure, the first extension and the second extension are located at both sides of each of the plurality of battery cells.

In an embodiment of the present disclosure, the fireproof member body extends in a vertical direction, and the first extension and the second extension are located respectively at an upper end and a lower end of the fireproof member body.

In an embodiment of the present disclosure, the battery module further includes two end plates respectively located at both ends of the plurality of battery cells in a horizontal direction, the first extension and/or second extension of the fireproof member is fixed to the end plates.

In an embodiment of the present disclosure, a top surface of the end plate is provided with a fixing protrusion extending in the vertical direction, the first extension of the fireproof member is provided with a fixing bore for accommodating the fixing protrusion; or a lower surface of the first extension of the fireproof member is provided with a fixing protrusion extending in the vertical direction, and the top surface of the end plate is provided with a fixing bore for accommodating the fixing protrusion.

In an embodiment of the present disclosure, the plurality of battery cells are arranged in the vertical direction and/or horizontal direction.

In an embodiment of the present disclosure, the fireproof member extends in the arrangement direction of the battery cells, and covers the vents of all of the battery cells.

In an embodiment of the present disclosure, the fireproof member has a melting point greater than or equal to 500° C.

Herein, the vent of each of the plurality of battery cells faces the fireproof member, the fireproof member including a fireproof member body and a first extension connected to an upper end of the fireproof member, and the first extension extending in a direction towards the battery cells; and/or the fireproof member including a fireproof member body and a second extension connected to a lower end of the fireproof member, and the second extension extending in a direction towards the battery cells. When thermal runaway occurs to the battery cells, flames and high temperature particles ejected out of the vents of the battery cells are blocked by the fireproof member body and the first extension and/or the second extension, thus preventing the ejected flames and high temperature particles from burning neighboring battery cells, and preventing the battery cells that has undergone thermal runaway from inducing thermal runaway of other battery cells.

In another embodiment of the present disclosure, it is further provided a battery pack including:

a housing, and a plurality of battery modules according to any one of those provided in the above-described arranged in the housing.

Herein, the vent of each of the plurality of battery cells faces the fireproof member, the fireproof member including a fireproof member body and a first extension connected to an upper end of the fireproof member, and the first extension extending in a direction towards the battery cells; and/or the fireproof member including a fireproof member body and a second extension connected to a lower end of the fireproof member, and the second extension extending in a direction towards the battery cells. When thermal runaway occurs to the battery cells, flames and high temperature particles ejected out of the vents of the battery cells are blocked by the fireproof member body and the first extension and/or the second extension, thus preventing the ejected flames and high temperature particles from burning neighboring battery cells, and preventing the battery cells that has undergone thermal runaway from inducing thermal runaway of other battery cells.

LIST OF REFERENCE SIGNS

Figure 1:
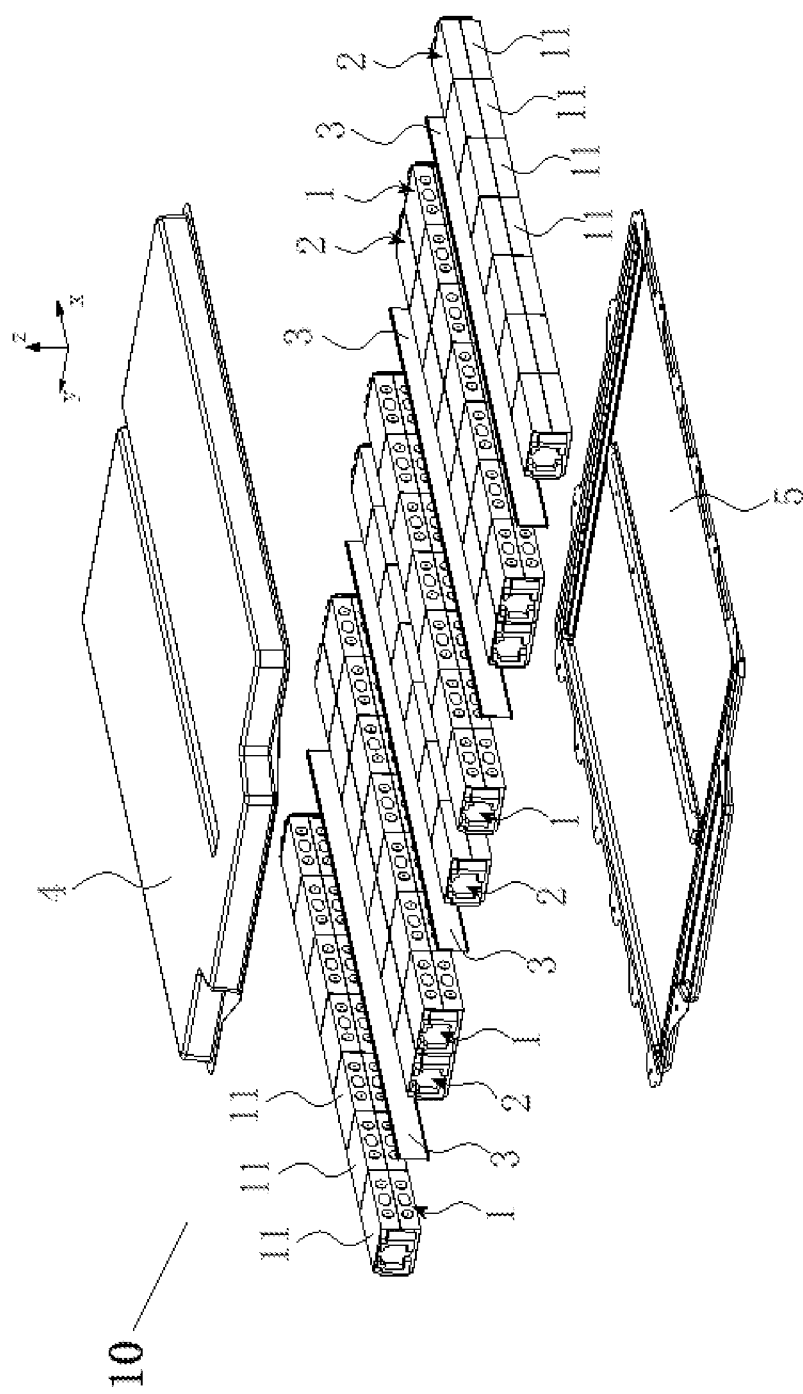
FIG. 1 shows an exploded view of the battery pack according to an embodiment of the present disclosure.

10. Battery pack
1. first battery module
11. battery cell
111. electrode assembly
1111. first electrode plate
1112. second electrode plate
1113. separator
1114. flat surface
112. case
1121. first surface
1122. second surface
113. electrode terminal connector
114. cap plate
115. electrode terminal
116. vent
12. first end plate
121. fixing protrusion
2. second battery module
21. second end plate
3. fireproof member
31. fireproof member body
311. first fireproof plate
312. second fireproof plate
32. first extension
321. fixing bore
33. second extension
34. third extension
35. fourth extension
4. upper housing cap
5. lower housing body
6. high temperature particle

DETAILED DESCRIPTION

Technical contents, structural features, objectives and effects of the present disclosure will be described in detail below with reference to the specific embodiments and the accompanying drawings.

In the description of the present disclosure, the terms "first" and "second" are used for descriptive purposes only, and are not to be construed as indicating or implying relative importance, unless otherwise specified and defined. The term "plurality" refers to two or more, unless otherwise specified and defined. The terms "connected" and "fixed", etc. should be perceived in a broad sense, for example, "connection" may either be a fixed connection, or a detachable connection, or an integrated connection, or an electrical connection; it may be a directly connection, or an indirect connection through an intermediate medium. For ordinarily skilled persons in the art, the specific meanings of the above terms in the present disclosure may be perceived on a case-by-case basis.

In the description of the present disclosure, the direction indicated by an arrow x in all the drawings is a length direction, the direction indicated by an arrow y in all the drawings is a width direction, and the direction indicated by an arrow z in all the drawings is a vertical direction. A horizontal direction is a direction parallel to the horizontal plane, and may either be the above-described length direction or be the above-described width direction. In addition, a horizontal direction includes not only a direction that is absolutely parallel to the horizontal plane, but also a direction generally parallel to the horizontal plane as is conventionally recognized in engineering. The vertical direction is a direction perpendicular to the horizontal plane, and the vertical direction includes not only the direction perpendicular to the horizontal plane, but also the direction generally perpendicular to the horizontal plane as is conventionally recognized in engineering. In addition, description on such terms as "upper", "lower", "top", "bottom" and the like are perceived relative to the vertical direction.

Figure 2:
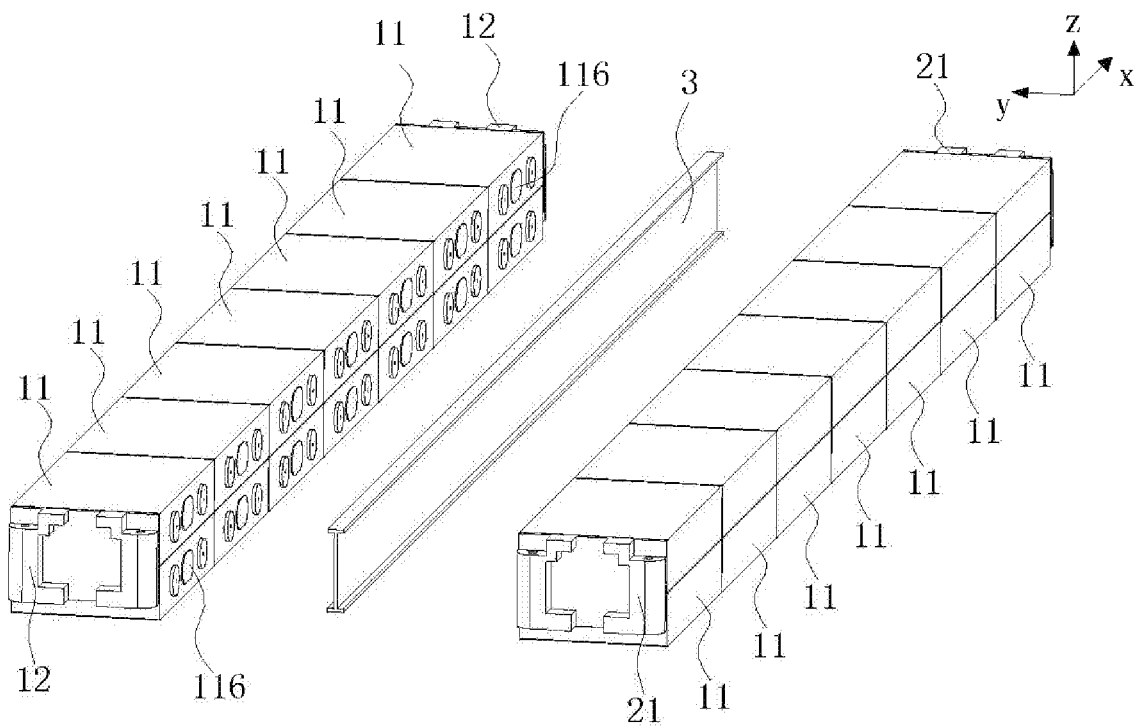
FIG. 2 shows a schematic structural view of a first battery module and second battery module according to an embodiment of the present disclosure.

With reference to FIG. 1 and FIG. 2, an embodiment of the present disclosure relates to a battery pack 10, including a housing and battery modules arranged in the housing. In the embodiment, a battery module includes a first battery module 1 and a second battery module 2; the battery pack 10 may include a plurality of first battery modules 1 and a plurality of second battery modules 2. Respectively, a first battery module 1 includes a plurality of battery cells 11 with each battery cell provided with a vent 116; a second battery module 2 includes a plurality of battery cells 11 with each battery cell provided with a vent 116. In the embodiment, four first battery modules 1 and four second battery modules 2 are taken as an example, but the numbers of the first battery modules 1 and second battery modules 2 are not limited thereto in practice.

Figure 3:
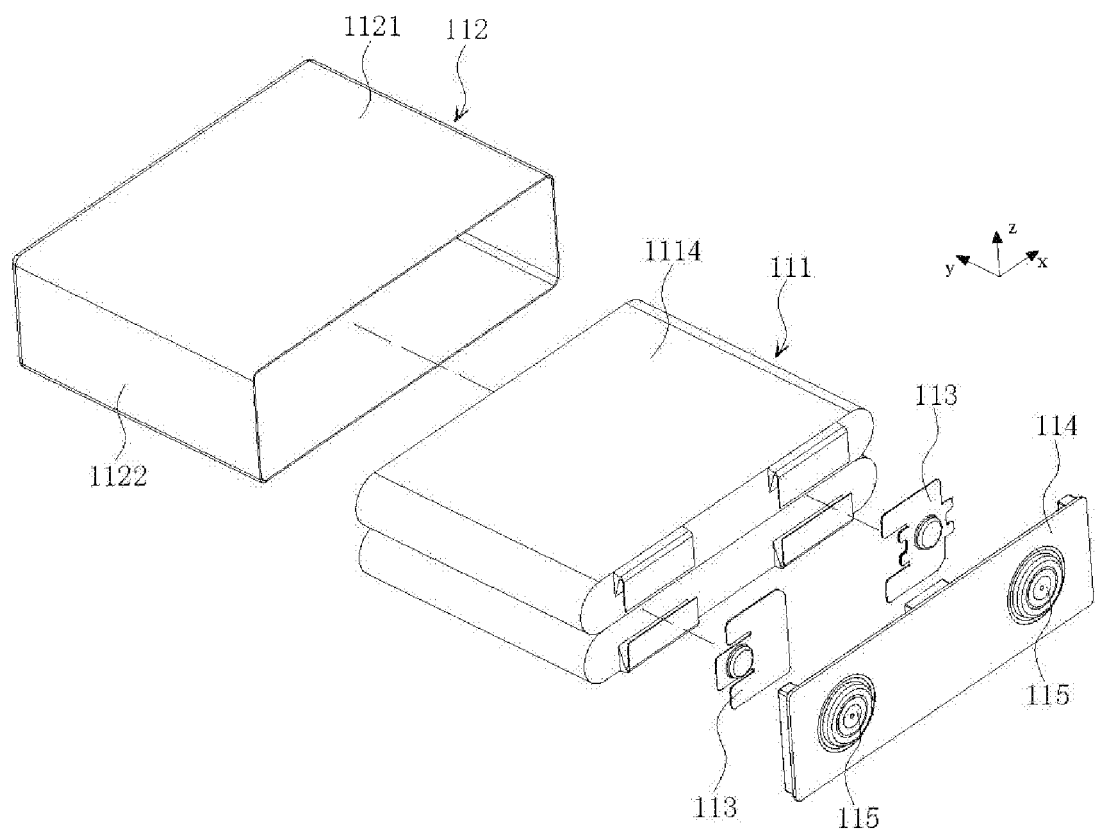
FIG. 3 shows an exploded view of a cell according to an embodiment of the present disclosure.

As shown in FIG. 3, a battery cell 11 includes an electrode assembly 111, a case 112, an electrode terminal connector 113, an electrode terminal 115, a vent 116 and a cap plate 114. The case 112 may be hexahedron-shaped or otherwise. The case 112 has an inner space accommodating the electrode assembly 111 and electrolyte, and the case 112 has an opening. The electrode assembly 111 is accommodated in the case 112. The cap plate 114 covers the opening and is used to encapsulate the electrode assembly 111 in the case 112. The vent 116 may be disposed on the cap plate 114. The electrode assembly 111 and the electrode terminal 115 are electrically connected by the electrode terminal connector 113.

In an embodiment of the present disclosure, the cap plate 114 is provided with two electrode terminals 115, i.e., a positive electrode terminal and a negative electrode terminal. Accordingly there are two electrode terminal connectors 113, i.e., a positive electrode terminal connector and a negative electrode terminal connector. The case 112 may be made of a material such as aluminum, aluminum alloy or plastic.

The electrode assembly 111 is accommodated in the case 112. The electrode assembly 111 includes a first electrode plate 1111, a second electrode plate 1112, and a separator 1113 arranged between the first electrode plate 1111 and the second electrode plate 1112. The first electrode plate 1111 may be a positive electrode plate or a negative electrode plate, and the second electrode plate 1112 is opposite in polarity against the first electrode plate 1111, and correspondingly, the second electrode plate 1112 is a negative electrode plate or a positive electrode plate. The separator 1113 is an insulator between the first electrode plate 1111 and the second electrode plate 1112. The electrode assembly 111 may be a wound structure (as shown in FIG. 4) or a laminated structure (as shown in FIG. 5).

Illustratively, the first electrode plate 1111 being a positive electrode plate and the second electrode plate 1112 being a negative electrode plate are taken as examples for description. Similarly, in other embodiments, the first electrode plate 1111 may be a negative electrode plate, and the second electrode plate 1112 may be a positive electrode plate. Further, a positive electrode active material is applied onto a coated region of a positive electrode plate, and a negative electrode active material is applied onto a coated region of a negative electrode plate. The uncoated region extending from the coated zone acts as a tab. The electrode assembly 111 includes two tabs, i.e., a positive tab and a negative tab, wherein the positive tab extends from the coated region of the positive electrode plate and the negative tab extends from the coated region of the negative electrode plate. The positive tab and the positive electrode terminal are electrically connected through a positive connector, and the negative tab and the negative electrode terminal are electrically connected through a negative connector.

The case 112 is approximately a hexahedral structure includes two first surfaces 1121 and two second surfaces 1122, the area of the first surfaces 1121 is larger than the area of the second surfaces 1122. In each battery cell 11 of the first battery module 1 and the second battery module 2, the two second surfaces 1122 of the case 112 are opposite to each other in the horizontal direction (for example, the length direction indicated by the arrow x), and the two first surfaces 1121 of the case 112 are opposite to each other in a vertical direction (for example, the direction indicated by the arrow z).

Figure 4:
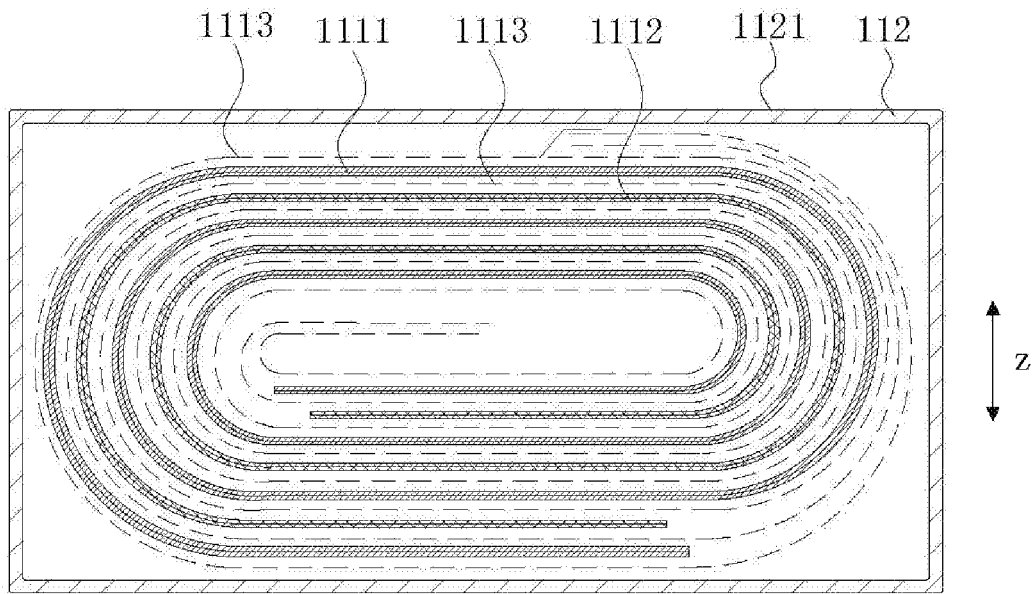
FIG. 4 shows a cross-sectional view showing an electrode assembly in a wound structure according to an embodiment of the present disclosure.
Figure 5:
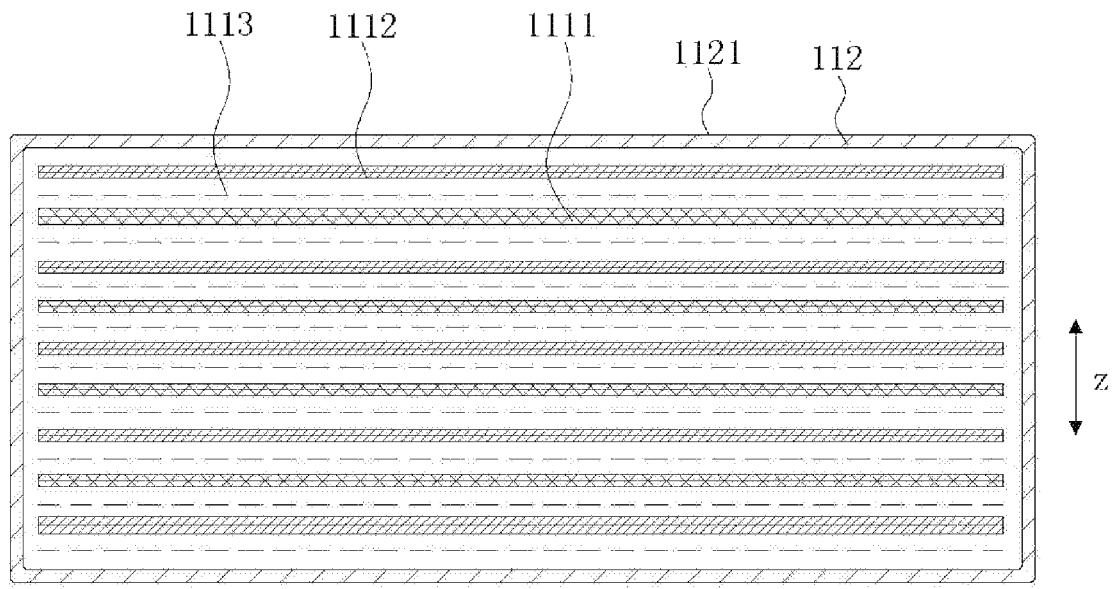
FIG. 5 shows a cross-sectional view of the electrode assembly in a laminated structure according to an embodiment of the present disclosure.

As shown in FIG. 4, when the electrode assembly 111 is a wound structure, the electrode assembly 111 is flat, and the outer surface of the electrode assembly 111 includes two flat surfaces 1114 that face each other in the vertical direction (the direction indicated by the arrow z), i.e., the flat two surfaces 1114 face to the first surfaces 1121. The electrode assembly 111 is approximately a hexahedral structure. Being the largest outer surface, the flat surfaces 1114 are generally parallel to the winding axis. The flat surfaces 1114 may be relatively flat but are not required to be absolutely flat.

As shown in FIG. 5, when the electrode assembly 111 is a laminated structure, the first electrode plate 1111, the separator 1113 and the second electrode plate 1112 are laminated in the vertical direction (the direction indicated by the arrow z), that is, the surface of the first electrode plate 1111 and the first surfaces 1121 face each other.

The electrode assembly 111 may swell in the thickness direction of the first electrode plate 1111 during charging and discharging (in the electrode assembly 111 of the wound structure, a swelling force is greatest in a direction perpendicular to the flat surfaces 1114; in the electrode assembly 111 of the laminated structure, the swelling force is greatest in a laminating direction of the first electrode plate 1111 and second electrode plate 1112).

In an embodiment of the present disclosure, the electrode assembly 111 may be a wound structure or a laminated structure. When the electrode assembly 111 is a wound structure, the flat surfaces 1114 faces a vertical direction (the direction indicated by the arrow z). In another embodiment of the present disclosure, the electrode assembly 111 is a laminated structure; the first electrode plate 1111 and the second electrode plate 1112 are laminated in the vertical direction (the direction indicated by the arrow z). It is seen that the electrode assembly 111, whether being a wound structure or a laminated structure, applies the greatest swelling force to the case 112 in the vertical direction.

However, in the existing technologies, in a cell 11 of the battery module 2, the greatest swelling force of the electrode assembly 111 to the case 112 is always in a horizontal direction. Since the dimension of the battery module 2 in the horizontal direction is much larger than the dimension in the vertical direction (for example, limited by a height of a car's chassis, more battery cells 11 are needed to be laminated in the horizontal direction, and the swelling force is accumulated, herein the vertical direction means the direction parallel to the height of the car), the existing battery module 2 bears an extremely great swelling force in the horizontal direction. Therefore, it is necessary to arrange two particularly thick end plates on both sides of the battery module 2 in the horizontal direction so as to resist the swelling force. However, an increased thickness to the end plates can decrease energy density of the battery module 2. While in the embodiment of the present disclosure, the electrode assembly 111 applies the greatest swelling force to the case 112 in the vertical direction, and there are fewer battery cells 11 stacked in the vertical direction, thereby significantly decreasing the greatest swelling force of the battery module 2, as compared with the existing technologies.

In addition, since the battery cells 11 may generate gas inside the case 112 during charging and discharging, the generated gas may apply a force to the case 112, thereby aggravating outward swelling of the case 112. Since the area of the first surfaces 1121 of the present disclosure is larger than the area of the second surfaces 1122, and the two first surfaces 1121 of the case 112 face each other in the vertical direction, the generated gas has the maximum force applied to the case 112 in the vertical direction, which further decreases the greatest swelling force of the battery module 2, as compared with the existing technologies.

In an embodiment of the present disclosure, the battery pack further includes a fireproof member 3, wherein the vent 116 of each of the plurality of battery cells 11 faces the fireproof member 3. The fireproof member 3 may be horizontally arranged (the length direction indicated by the arrow x), i.e., the fireproof member 3 extends in the horizontal direction. In this way, the vent 116 is disposed in the top surfaces of the battery cell 11, and the fireproof member 3 is disposed on the vent 116. Alternatively, the vent 116 is disposed in the bottom surfaces of the battery cell 11, and the fireproof member 3 is disposed under the vents 116.

Alternatively, the fireproof member 3 may further be vertically arranged (the direction indicted by the arrow z as shown in the drawings), that is, the fireproof member 3 extends in the vertical direction, as shown in FIG. 2.

As shown in FIG. 2, in an embodiment of the present disclosure, the vent 116 of each of a plurality of battery cells in the first battery module 1 and the vent 116 of each of a plurality of battery cells in the second battery module 2 both face the fireproof member 3, i.e., the fireproof member 3 is located between the vent 116 of each of a plurality of battery cells in the first battery module 1 and the vent 116 of each of a plurality of battery cells in the second battery module 2. In this way, the vent 116 of each of the plurality of battery cells 11 in the first battery module 1 and the vent 116 of each of the plurality of battery cells 11 in the second battery module 2 are oriented in the horizontal direction (for example, the width direction indicated by the arrow y).

Further, the melting point of the fireproof member 3 is greater than or equal to 500° C., so that flames cannot melt the fireproof member 3, thereby having the fireproof function. Particularly, in an embodiment of the present disclosure, sine the fireproof member 3 is made of mica which has a high melting point (around 1723° C.), a requirement for fire-resistance by the fireproof member 3 is achieved; besides, a mica board has excellent processing properties. However, it is not limited to the embodiment of a mica board.

In an embodiment of the present disclosure, the plurality of battery cells 11 of the first battery module 1 are arranged in the vertical direction (the direction indicated by the arrow z) and/or in the horizontal direction (e.g., the length direction indicated by the arrow x), and the plurality of battery cells 11 of the second battery module 2 are arranged in the vertical direction (the direction indicated by the arrow z) and/or in the horizontal direction (e.g., the length direction indicated by the arrow x). Specifically, the first battery module 1 and the second battery module 2 may have one to five 1-5 battery cells 11 arranged in the vertical direction (the direction indicated by the arrow z), respectively. The first battery module 1 and the second battery module 2 may have five to twenty battery cells 11 arranged in the horizontal direction (e.g., the length direction indicated by the arrow x), respectively. In another embodiment of the present disclosure, the dimension of the first battery module 1 in the vertical direction (the direction indicated by the arrow z) is smaller than the dimension of the first battery module 1 in the length direction x. The dimension of the first battery module 1 in the vertical direction (the direction indicated by the arrow z) is smaller than the dimension of the first battery module 1 in the width direction y.

In an embodiment of the present disclosure, the first battery module 1 further includes two first end plates 12 which are respectively located at two ends of the plurality of battery cells 11 of the first battery module 1 in the horizontal direction, the first end plates 12 are used for fixing the plurality of battery cells 11 of the first battery module 1. Similarly, the second battery module 2 further includes two second end plates 21 which are respectively located at both ends of the plurality of battery cells 11 of the second battery module 2 in the horizontal direction (e.g., the length direction indicated by the arrow x), the second end plates 12 are used for fixing the plurality of battery cells 11 of the first battery module 1.

As shown in FIG. 2, in the embodiment of the present disclosure, both the first battery module 1 and the second battery module 2 include seven battery cells 11 arranged in the length direction (the length direction indicated by the arrow x) and two rows of battery cells 11 arranged in the vertical direction (the direction indicated by the arrow z). The number, length, height, volume and the like of the battery cells 11 may be readjusted as needed.

Alternatively, the fireproof member 3 extends in a direction in which the battery cells 11 are arranged, and the fireproof member 3 covers the vents 116 of all of the battery cells 11. That is, the fireproof member 3 covers the vents 116 of all the battery cells 11 of the first battery module 1 and the vents 116 of all the battery cells 11 of the second battery module. With this design, it is enables to prevent any of the battery cells 11 that has undergone thermal runaway from inducing thermal runaway of adjacent battery cells opposite to their vents 116.

In an embodiment of the present disclosure, the fireproof member 3 may be fixed to the first battery module 1 or the second battery module 2 by glue.

Figure 6:
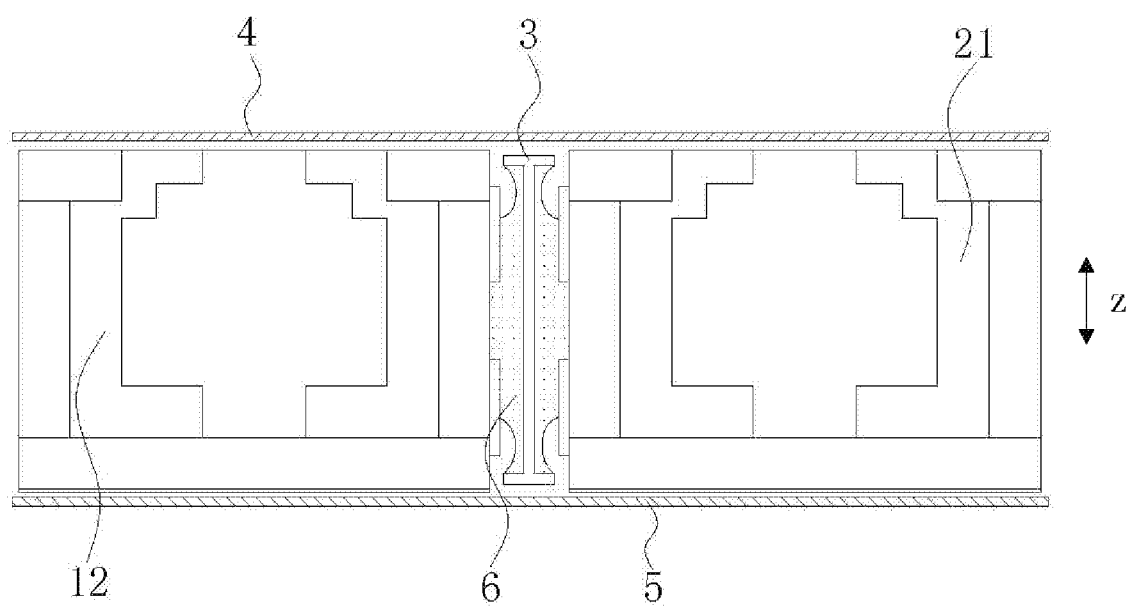
FIG. 6 shows a partial cross-sectional view of a battery pack according to an embodiment of the present disclosure.

As shown in FIG. 6, when thermal runaway occurs to the battery cells 11 (which may be the battery cells 11 of the first battery module 1 or the battery cells 11 of the second battery module 2), the vents 116 are broken and ejects flames and high temperature particles 6. At this time, since the fireproof member 3 is provided, both flames and high temperature particles 6 are blocked by the fireproof member 3, and the battery cells 11 of the first battery module 1 and the battery cells 11 of the second battery module 2 do not mutually affect each other, thereby a collective thermal runaway is prevented. In addition, since flames and high temperature particles 6 do not directly ejected upward, safety of the battery pack may be improved.

Specifically, the fireproof member 3 includes a fireproof member body 31 and a first extension 32 connected to the upper end of the fireproof member body 31, wherein the first extension 32 extending toward the first battery module 1; and/or, the fireproof member 3 includes a fireproof member body 31 and a second extension 33 connected to the lower end of the fireproof member 3, wherein the second extension 33 extending toward the first battery module 1. Since the first extension 32 is provided, it is enables to block flames and high temperature particles 6 from being diffused upward, further improving safety of the battery pack. Similarly, since the second extension 33 is provided, it is enables to block flames and high-temperature particles 6 from being diffused downward, thereby further improving safety of the battery pack.

Alternatively, the fireproof member 3 further includes a third extension 34 which is connected to the upper end of the fireproof member body 31, and extends in a direction towards the second battery module 2; and/or, the fireproof member 3 further includes a fourth extension 35 which is connected to the lower end of the fireproof member body 31, and extends in a direction toward the second battery module 2. Since the third extension 34 is provided, flames and high temperature particles 6 can be blocked from being diffused upward, thereby further improving safety of the battery pack. Since the fourth extension 35 is provided, flames and high temperature particles 6 can be blocked from being diffused downward, thereby further improving safety of the battery pack.

Figure 7:
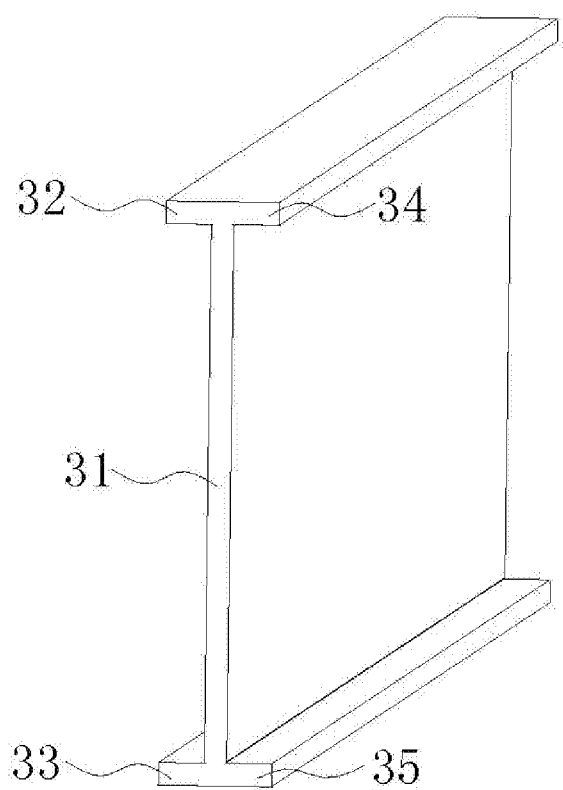
FIG. 7 shows a schematic structural view of a fireproof member according to an embodiment of the present disclosure.

As shown in FIG. 7, in another embodiment of the present disclosure, the fireproof member 3 includes the fireproof member body 31, the first extension 32 and a third extension 34 connected to the upper end of the fireproof member body 31, and the second extension 33 and a fourth extension 35 connected to the lower end the fireproof member body 31.

Further, the first extension 32 and the second extension 33 respectively locate on top sides and bottom sides of the plurality of battery cells 11 of the first battery module 1, that is, a projection of the first extension 32 in the vertical direction overlaps at least partially with the projection of the battery cells 11 in the vertical direction, and a projection of the second extension 33 in the vertical direction overlaps at least partially with the projection of the battery cells 11 in the vertical direction. In other words, the first extension 32 overlaps at least partially the upper surface of the battery cells 11, and the second extension 33 overlaps at least partially the lower surface of the battery cells.

Further, the third extension 34 and the fourth extension 35 respectively locate on top sides and bottom sides of the plurality of battery cells 11 of the second battery module 2, that is, a projection of the third extension 34 in the vertical direction overlaps at least partially with a projection of the battery cells 11 in the vertical direction, and a projection of the fourth extension 35 in the vertical direction overlaps at least partially with the projection of the battery cells 11 in the vertical direction. In other words, the third extension 34 overlaps at least partially the upper surface of the battery cells 11, and the fourth extension 35 overlaps at least partially the lower surface of the battery cells.

In this way, the vents 116 of the first battery module 1 and second battery module 2 can be covered in three directions at the same time by the first extension 32, the third extension 34, the second extension 33 and the fourth extension 35, thereby preventing flames and high temperature particles 6 from being ejecting upward or downward when thermal runaway occurs to the battery cells 11.

In an embodiment of the present disclosure, the fireproof member body 31, the first extension 32, the second extension 33, the third extension 34 and the fourth extension 35 are in an integrated structure. With this design, only one fireproof member 3 can cover vents 116 of the first battery module 1 and vents of the second battery module 2, thereby reducing the number of the fireproof members 3 and installation difficulty.

Figure 8:
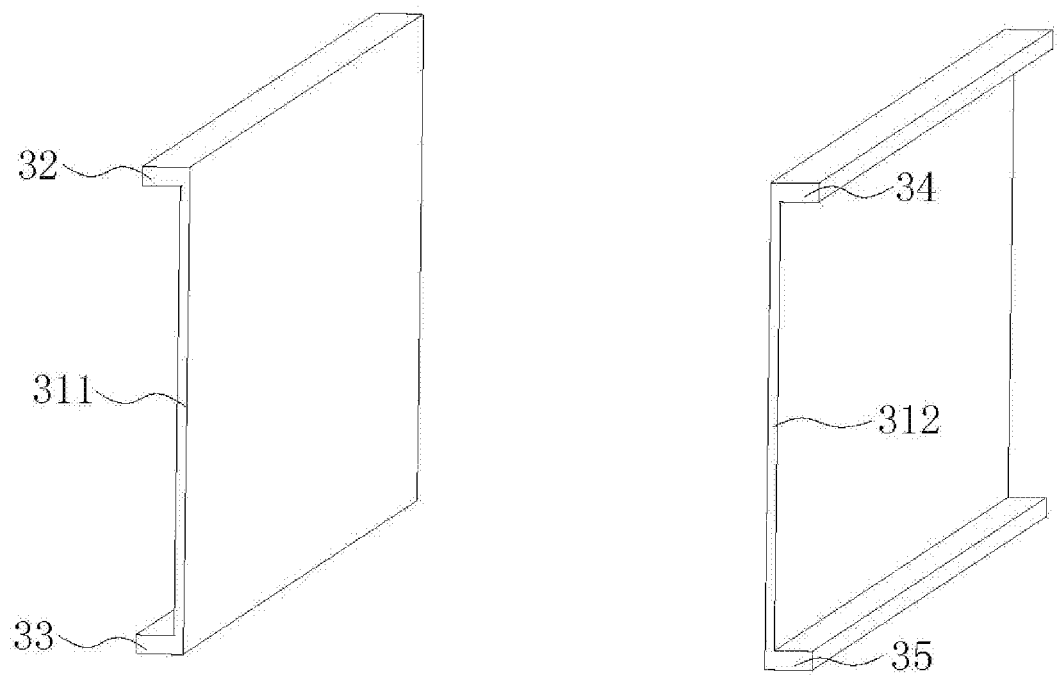
FIG. 8 shows a schematic structural view of a fireproof member according to another embodiment of the present disclosure.

In another embodiment of the present disclosure, as shown in FIG. 8, the fireproof member body 31 may include a first fireproof plate 311 and a second fireproof plate 312, wherein the first fireproof plate 311 and the second fireproof plate 312 are in an separated structure. The first fireproof plate 311 locates on a side of the second fireproof plate 312 facing the first battery module 1. The first extension 32 and the second extension 33 are respectively arranged at an upper end and lower end of the first fireproof plate 311. The first extension 32, the second extension 33 and the first fireproof plate 311 are in an integrated structure. The third extension 34 and the fourth extension 35 are respectively arranged at an upper end and lower end of the second fireproof plate 312. The third extension 34, the fourth extension 35 and the second fireproof plate 312 are in an integrated structure.

However, it is necessary to indicate that there may be possibilities of any combinations among the first extension 32, the second extension 33, the third extension 34 and the fourth extension 35 of the fireproof member 3. Further, the pattern of the fireproof member 3 may be readjusted based on the above embodiments of the present disclosure, so as to achieve the prime effect, that is, the fireproof member 3 is not limited to the pattern described in the embodiments of the present disclosure.

Figure 9:
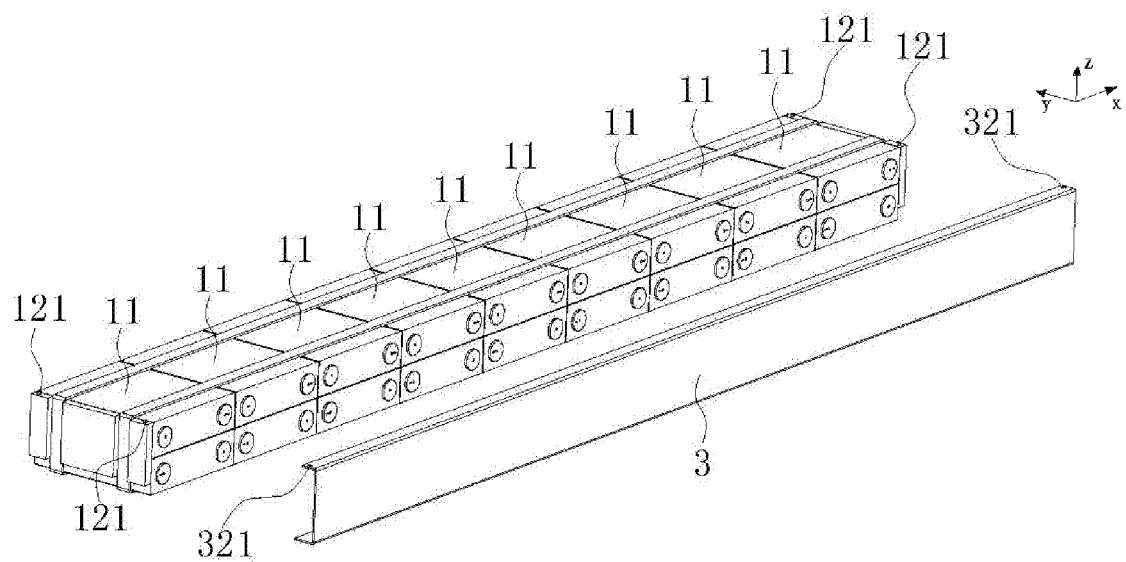
FIG. 9 shows an exploded view of the fireproof member and the first battery module according to an embodiment of the present disclosure.
Figure 10:
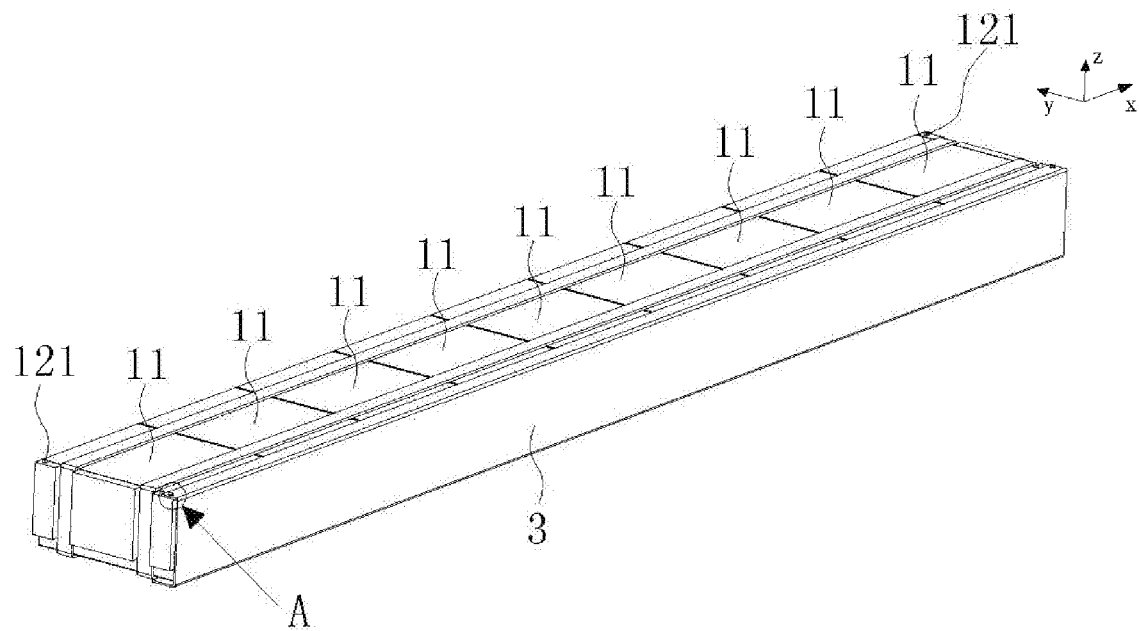
FIG. 10 shows a schematic view when the fireproof member is fixed to a first end plate according to an embodiment of the present disclosure.

As shown in FIG. 9 and FIG. 10, in an embodiment of the present disclosure, the first battery module 1 includes two first end plates 12 which locate at both ends of the plurality of battery cells 11 of the first battery module 1 in a horizontal direction, the first extension 32 and/or the second extension 33 of the fireproof member 3 is fixed with a first end plate 12.

Figure 11:
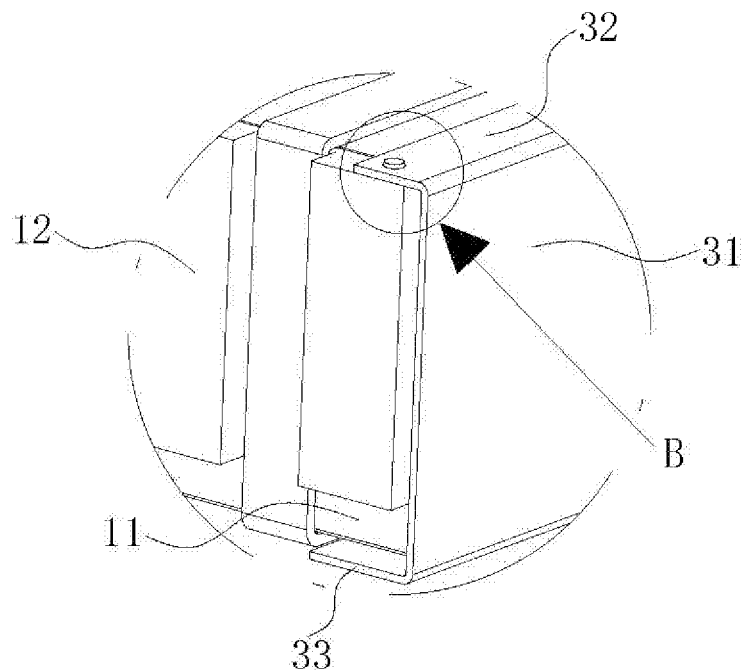
FIG. 11 shows an enlarged view at A of FIG. 10.

As shown in FIG. 11, in an embodiment of the present disclosure, the fireproof member 3 includes the fireproof member body 31, the first extension 32 and the second extension 33, wherein the first extension 32 and the second extension 33 are located respectively at both sides of the plurality of battery cells. In particular, the fireproof member body 31 extends in the vertical direction (the direction indicated by the arrow z), and the first extension and second extension are respectively located at the upper end and lower end of the fireproof member body 31. In this way, the fireproof member 3 encompasses the battery cells 11 in both the horizontal direction (the direction indicated by the arrow y) and the vertical direction (the direction indicated by the arrow z). When thermal runaway occurs to the battery cells 11, flames and high temperature particles 6 ejected out of the vents 116 of the battery cells 11 can be blocked by the fireproof member 3.

Figure 12:
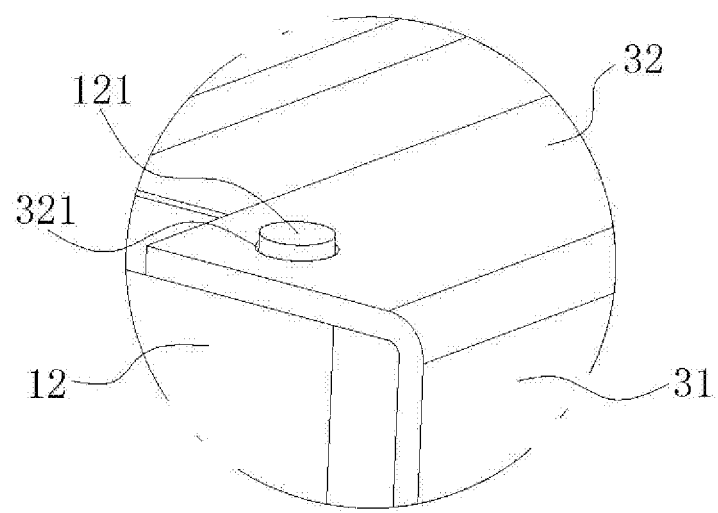
FIG. 12 shows an enlarged view at B of FIG. 10.

As shown in FIG. 12, in an embodiment of the present disclosure, an upper end of the first end plate 12 is provided with a fixing protrusion 121 in the vertical direction, the first extension 32 of the fireproof member 3 is provided with a fixing bore 321 for accommodating the fixing protrusion 121.

Alternatively, a lower surface of the first extension 32 of the fireproof member 3 is provided with a fixing protrusion 121 extending in the vertical direction, and the top end of the first end plate 12 is provided with a fixing bore 321 for accommodating the fixing protrusion 121. In this way, the fireproof member 3 is fixed to the first end plate 12 by matching the fixing protrusion 121 with the fixing bore 321, making both assembling and disassembling easy and convenient.

Optionally, in an embodiment of the present disclosure, the housing comprises an upper housing cap 4 and a lower housing body 5 which are sealed to each other, and a side wall or a bottom wall of the lower housing body 5 is provided with an accommodating slot for accommodating the fireproof member 3. In this way, the fireproof member 3 can be fixed well by the accommodating slot.

In an assembling process, a plurality of battery cells 11 are arranged in the horizontal direction (the direction indicated by the arrow x) and vertical direction (the direction indicated by the arrow z), two end plates are located on both ends of an arrangement of the plurality of battery cells 11 in the horizontal direction (the direction indcted by the arrow x), so as to form a battery module; and a plurality of battery modules are arranged within a housing, in which all the vents 116 of the battery modules face the same fireproof member 3.

It shall be noted that although the above embodiments have been described herein, the protection scope of the present disclosure is not limited hereby. Therefore, based on the innovative concept of the present disclosure, changes and modifications performed on the embodiments herein, changes to equivalent structures and processes in accordance with the specification of the specification and the drawings, and direct and indirect application of the above-described technical solutions in other related technical fields are all included in the protection scope of the present disclosure.

What is claimed is:

1. A battery module, comprising:
   a plurality of battery cells arranged in a first horizontal direction, wherein each of the plurality of battery cells is provided with a vent oriented in a second horizontal direction; and
   a fireproof member, wherein the vent of each of the plurality of battery cells faces the fireproof member, and the fireproof member covers all vents of the battery cells;
   wherein the fireproof member comprises a fireproof member body, a first extension connected to an upper end of the fireproof member, and a second extension connected to a lower end of the fireproof member body, the fireproof member body extends in a vertical direction, the first extension and the second extension extend in a direction towards the battery cells; and the first extension overlaps at least partially an upper surface of the battery cells, the second extension overlaps at least partially a lower surface of the battery cells; and projections of the first extension and the second extension extend over the entire length of the battery module in the first horizontal direction.

2. The battery module according to claim 1, wherein the battery module further comprises two end plates respectively located at two ends of the plurality of battery cells in the first horizontal direction, and the first extension and/or second extension of the fireproof member are/is fixed to the end plates.

3. The battery module according to claim 2, wherein a top surface of each of the two end plates is provided with a fixing protrusion extending in the vertical direction, the first extension of the fireproof member is provided with a fixing bore for accommodating the fixing protrusion; or a lower surface of the first extension of the fireproof member is provided with a fixing protrusion extending in the vertical direction, and the top surface of the end plate is provided with a fixing bore for accommodating the fixing protrusion.

4. The battery module according to claim 1, wherein the fireproof member has a melting point greater than or equal to 500° C.

5. A battery pack, comprising:

a housing, and a plurality of battery modules arranged in the housing; wherein each of the plurality of battery modules comprises a plurality of battery cells arranged in a first horizontal direction, and each of the plurality of battery cells is provided with a vent oriented in a second horizontal direction; and a fireproof member, wherein the vent of each of the plurality of battery cells faces the fireproof member, the fireproof member covers all vents of the battery cells, and the fireproof member comprises a fireproof member body, a first extension connected to an upper end of the fireproof member, and a second extension connected to a lower end of the fireproof member body, the fireproof member body extends in a vertical direction, the first extension and the second extension extend in a direction towards the battery cells; and the first extension overlaps at least partially an upper surface of the battery cells, the second extension overlaps at least partially a lower surface of the battery cells; and projections of the first extension and the second extension extend over the entire length of the battery module in the first horizontal direction.

6. The battery pack according to claim 5, wherein the battery module further comprises two end plates respectively located at two ends of the plurality of battery cells in the first horizontal direction, and the first extension and/or second extension of the fireproof member are/is fixed to the end plates.

7. The battery pack according to claim 6, wherein a top surface of each of the two end plates is provided with a fixing protrusion extending in the vertical direction, the first extension of the fireproof member is provided with a fixing bore for accommodating the fixing protrusion; or a lower surface of the first extension of the fireproof member is provided with a fixing protrusion extending in the vertical direction, and the top surface of the end plate is provided with a fixing bore for accommodating the fixing protrusion.

8. The battery pack according to claim 5, wherein the fireproof member has a melting point greater than or equal to 500° C.

* * * * *